(12) United States Patent
Steux et al.

(10) Patent No.: US 8,503,007 B2
(45) Date of Patent: Aug. 6, 2013

(54) METHOD, COMPUTER PROGRAM, AND SYSTEM FOR PROCESSING SEVERAL DOCUMENT PROCESSING JOBS

(75) Inventors: Jean-Marc Christian Alfred Steux, Andenne (BE); Johan Geert Vons, Le Perreux sur Marne (FR); Hartwig Schwier, München (DE); Albin Stoderschnig, München (DE)

(73) Assignee: Océ Printing Systems GmbH, Poing (DE)

( * ) Notice: Subject to any disclaimer, the term of this patent is extended or adjusted under 35 U.S.C. 154(b) by 1395 days.

(21) Appl. No.: 11/813,924

(22) PCT Filed: Jan. 20, 2006

(86) PCT No.: PCT/EP2006/050338
§ 371 (c)(1),
(2), (4) Date: Aug. 13, 2007

(87) PCT Pub. No.: WO2006/077246
PCT Pub. Date: Jul. 27, 2006

(65) Prior Publication Data
US 2008/0072233 A1    Mar. 20, 2008

(30) Foreign Application Priority Data

Jan. 21, 2005 (DE) .......................... 10 2005 003 130
Dec. 22, 2005 (DE) .......................... 10 2005 061 605

(51) Int. Cl.
*G06F 3/12* (2006.01)
*H04N 1/21* (2006.01)
*G06K 15/00* (2006.01)

(52) U.S. Cl.
USPC .......... 358/1.15; 358/1.14; 358/1.1; 358/296; 358/1.18; 709/203; 709/246; 709/225; 710/19; 715/209

(58) Field of Classification Search
USPC ........ 358/1.15, 1.1, 1.14, 296, 1.16; 709/246, 709/225
See application file for complete search history.

(56) References Cited

U.S. PATENT DOCUMENTS

| | | | |
|---|---|---|---|
| 5,265,221 A | 11/1993 | Miller | |
| 5,287,194 A | 2/1994 | Lobiondo | |
| 5,450,593 A | 9/1995 | Howell et al. | |
| 6,529,286 B1 | 3/2003 | King | |
| 6,587,861 B2 * | 7/2003 | Wakai et al. | 715/209 |
| 6,621,589 B1 | 9/2003 | Al-Kazily et al. | |
| 7,084,998 B2 * | 8/2006 | Blair et al. | 358/1.15 |

(Continued)

FOREIGN PATENT DOCUMENTS

| | | |
|---|---|---|
| DE | 100 27 222 | 4/2001 |
| DE | 695 20 729 | 9/2001 |

(Continued)

OTHER PUBLICATIONS

The World of Print—Chapter 14 Print on Demand.

*Primary Examiner* — Akwasi M Sarpong
(74) *Attorney, Agent, or Firm* — Schiff Hardin LLP

(57) ABSTRACT

In a method for processing of a plurality of document processing jobs in a computer-aided document processing system, job chaperone data are generated that identify a preferred job processing apparatus relative to other job processing apparatuses of a same type in a job provider computer with respect to a document processing job.

25 Claims, 5 Drawing Sheets

U.S. PATENT DOCUMENTS

| | | | |
|---|---|---|---|
| 7,385,720 B2* | 6/2008 | Bhatti | 358/1.15 |
| 7,567,360 B2* | 7/2009 | Takahashi et al. | 358/1.15 |
| 7,936,468 B2* | 5/2011 | Ferlitsch | 358/1.15 |
| 2002/0089687 A1* | 7/2002 | Ferlitsch et al. | 358/1.15 |
| 2002/0138631 A1 | 9/2002 | Friedel et al. | |
| 2003/0231328 A1* | 12/2003 | Chapin et al. | 358/1.13 |
| 2004/0049684 A1 | 3/2004 | Nomura et al. | |
| 2004/0190057 A1* | 9/2004 | Takahashi et al. | 358/1.15 |

FOREIGN PATENT DOCUMENTS

| | | |
|---|---|---|
| EP | 0 720 086 | 4/2001 |
| WO | WO 89/06024 | 6/1989 |
| WO | WO 02/093354 | 11/2002 |

* cited by examiner

METHOD, COMPUTER PROGRAM, AND SYSTEM FOR PROCESSING SEVERAL DOCUMENT PROCESSING JOBS

BACKGROUND

The preferred embodiment concerns a method, a computer program and a data processing system for processing of a plurality of document processing jobs.

The preferred embodiment in particular concerns data processing systems in which document data are transmitted to printing systems for printout per file as jobs together with a job chaperone file and/or in which printed documents are further processed with what are known as finishing apparatuses in which they are, for example, cut, folded, enveloped, bound or stitched. Finishing apparatuses can thereby also be integrated into printing systems or vice versa.

A document processing system for processing of document data is known from WO 02/093354 A1, in which data processing system document data are acquired from a data server and from there are distributed to various high-capacity printing apparatuses. The printed documents can subsequently by supplied to finishing apparatuses.

From WO 89/06024 A a printing system is known in which various print jobs are buffered in a mass storage and are printed according to predetermined criteria automatically or only after a user intervention. From EP 0 720 086 B a digital printing and copying system is known in which the upcoming stored print jobs are automatically processed or can be manually pushed to the printer. Given the automatic processing various printing criteria can additionally be changed by the operator.

An order distribution system (ODS) that is also designated as a workflow manager is described in the publication "Das Druckerbuch, Technik und Technologien der OPS Hochleistungsdrucker", Edition 5a, October 2000 (ISBN 3-00-001019-X) in chapter 15. The entire digital printing process, which comprises a printing pre-stage, a high-capacity printer and an end processing, can be controlled with this order distribution system. In the printing pre-stage image and text files from different sources (such as scanners, digital cameras, data media or a computer network) are merged and brought into their final form at a layout station. A printer driver subsequently converts the data generated at various platforms into, for example, PostScript files. These files can then be relayed to a print server for printing. The print server controls the printing process. The final processing (finishing) of the print product comprises, for example, the binding or insertion of divider pages.

The order distribution system is moreover responsible for the central administration of the production variants. The printing service for intranet and Internet users also belongs to this. The order distribution system informs users about approved production variants, accepts print jobs together with job folders, initiates the automatic processing up to the printing. The order distribution system also monitors the correct execution of the selected printing and post-processing options.

Here the order distribution system processes job chaperone files, what are known as job tickets. A job ticket is a file that is created by the user upon generation of the print job, in which file all specifications are contained that are to be executed in the printing process. Conventional job tickets comprise unambiguous instructions that are to be correspondingly implemented.

The printing process is becoming increasingly more comprehensive since ever more apparatuses are integrated into a printing process, whereby the function variety increases. Printing processes are increasingly executed distributed regionally via the Internet and intranet or are associated with a pool of printers that can be regionally distributed. Moreover, apparatuses of different manufacturers must increasingly work together in a process. In order to be equal to these increased requirements, a uniform specification for exchange of data formats was stipulated that is designated as a job definition format (JDF). For this there is a corresponding job messaging format (JMF) that is correspondingly specified. The specification of JDF can be downloaded from the Internet site www.cip4.orq; the specification current at the point in time of the present patent application is JDF specification release 1.2.

A workflow based on JDF is known from DE-A1-103 39 511.

An output management system for print jobs with the trade name Océ Print Exec Pros is known from Océ Technologies B.V., Netherlands, in which output management system it is provided that completion dates or, respectively, times are specified for print jobs with the dispatch of the job. Systems for processing of print jobs are known from EP-B1-720 086 and from US 2004/0218201 A1.

A method and a system for processing of jobs in which a selection from a plurality of processing apparatuses can be made for processing of the jobs is known from U.S. Pat. No. 6,587,861.

The aforementioned publications and documents are herewith incorporated by reference into the present specification.

JDF is an XML-based format in which the instructions for the printing process are arranged in a tree structure. Every node of the tree structure comprises an instruction or a set of instructions. The uppermost node is designated as a root. The end nodes at branches are designated as leaf nodes. Furthermore, the nodes are hierarchically structured, whereby in the tree structure product nodes lie at the tip or in the upper region, process group nodes lie in a middle region and process nodes lie in the lower region.

The distinctiveness of JDF lies in that there can be what are known as intent nodes that contain a very general instruction for the printing process that must be rendered more precisely in order to be able to be executed at an apparatus. The product nodes are in particular also designated as product intent nodes. This more precise rendering, which is also designated as a resolution, is executed by a corresponding controller in the course of the printing process in that one or more further nodes that render the instruction of the intent node more precisely are subordinated to the intent node. This resolution can occur in steps, meaning that a cascade of further nodes are subordinated to the intent node, whereby the exact instructions for the apparatus (in particular the printer) are contained in the last node (the leaf node).

The resolution of the intent instructions into more precise instructions up to the commands contained in the leaf nodes occurs by means of programs that are designed similar to device drivers and that convert general intent instructions into more concrete intent instructions or into concrete commands for a printer or an apparatus. Specifications about resources that are contained in the respective nodes are also taken into account in this conversion. According to the JDF specification, resources are all things that are consumed or produced. They comprise physical objects (such as, for example, paper, ink) or data in the form of files or parameters. A resource has an XML ID with which it is identified in the overall job ticket.

In such methods in which document processing jobs are automatically processed by means of a system that comprises a plurality of networked computers, often the apparatuses that execute the document processing job (such as printer, folding device, punching device and the like) are also automatically determined. This occurs in that specific criteria are predetermined by the print job and an apparatus is selected that corresponds to these criteria. This method has proven itself very well for conventional systems for automatic processing of document processing jobs. However, if document processing jobs according to the JDF format are used that are initially very non-specific and are rendered more precisely in the course of the processing, it has arisen that the selection of the apparatuses is often not optimal. It has in particular arisen that the selection of a specific apparatus according to the applicable specification can lead to the situation that print jobs are buffered for a long time given intensive utilization of the apparatus or are redirected to an apparatus disadvantageously situated for the user.

SUMMARY

It is an object to specify techniques for processing of a plurality of document data processing jobs with which apparatuses of the same type that are used for processing are available in an optimally user-friendly manner given intensive utilization.

In a method for processing of a plurality of document processing jobs in a computer-aided document processing system, job chaperone data are generated that identify a preferred job processing apparatus relative to other job processing apparatuses of a same type in a job provider computer with respect to a document processing job.

DESCRIPTION OF THE PREFERRED EMBODIMENT

Figure 1:
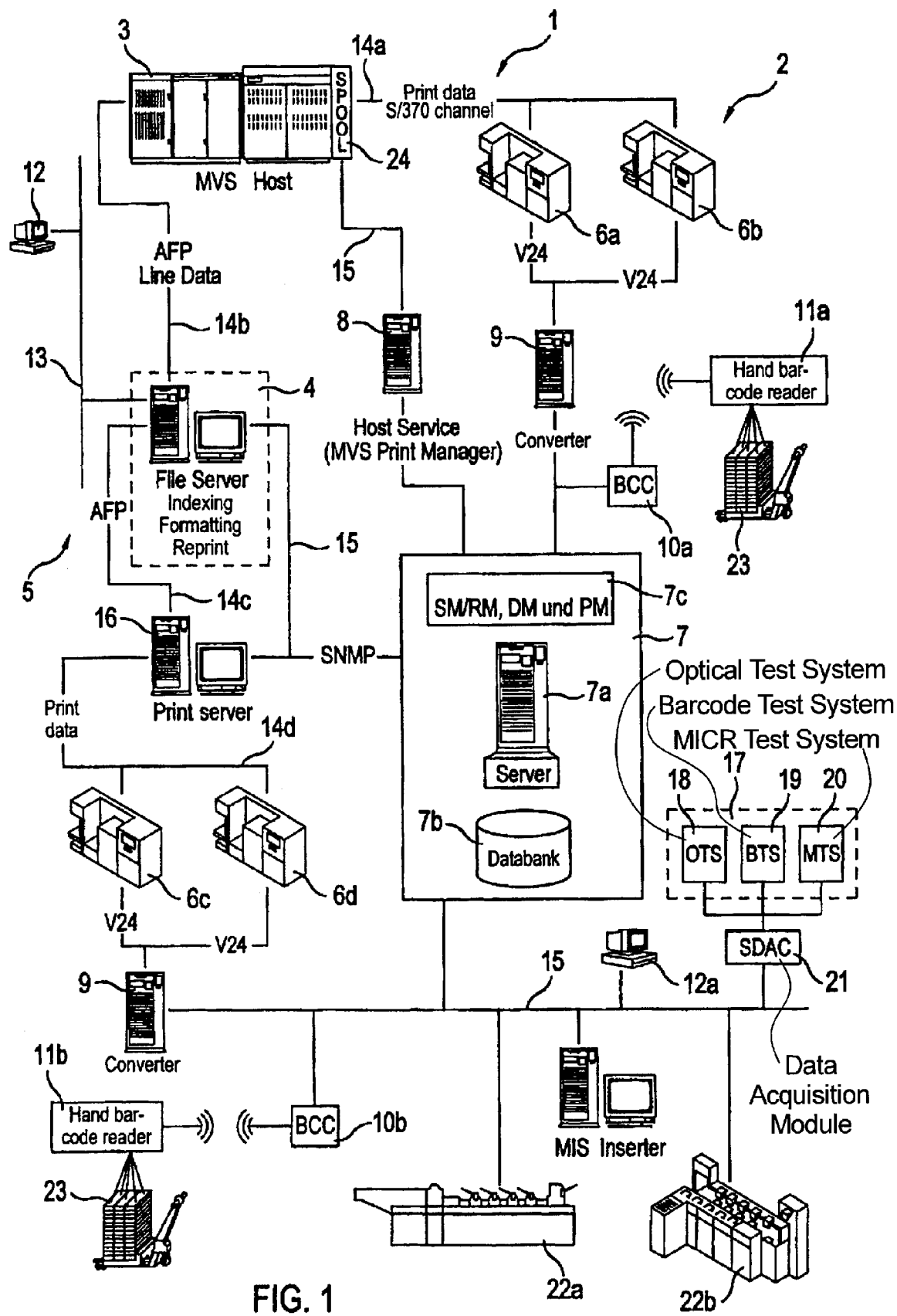
FIG. 1 is a complex document production system.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

According to a first aspect of the preferred embodiment/best mode, job chaperone data that identify a job processing apparatus preferred relative to other job processing apparatuses of the same type are generated in a job provider computer with regard to a document processing job for processing of a plurality of document processing jobs in a computer-aided document processing system.

Furthermore, using the preference data in a job agent computer it is possible to decide at which of a plurality of available job processing apparatuses of the same type the document processing job is processed.

According to the preferred embodiment it was in particular assumed that it is advantageous for a user to not specify, with regard to an apparatus type (for example a printing apparatus), a single apparatus as a determination apparatus for processing of his job but rather to specify this apparatus only as a preferred apparatus. On the one hand it is hereby possible to specify a plurality of apparatuses of the same type as possible job processing apparatuses and to assign a specific degree of preference to each of these apparatuses. Given the wholly automatic or semi-automatic further processing of the job, using the degree of preference and possibly other criteria (such as, for example, the availability of the respective apparatus and/or the capabilities of the apparatus) it can be decided by which apparatus the job is ultimately processed. It is thereby in particular also advantageous to give the user the possibility to associate degrees of importance with regard to availability or the urgency of the finishing underlying the job and/or the apparatus capabilities (such as, for example, duplex printing or binding), which degrees of importance are likewise taken into account in the final apparatus assignment. Degree of importance and degree of preference can in particular be set in multiple levels.

According to a preferred exemplary embodiment, specifications about the preferred job processing apparatus and/or about the importance of the job parameter occur via a graphical user interface.

The preferred embodiment is in particular usable for job processing apparatuses of the type "printing apparatus" and of the type "document finishing apparatus". The apparatuses designated as of the same type in the framework of the preferred embodiment can vary depending on the requirement and in particular it can be provided to freely configure apparatuses of the same type on the part of the job provider (in particular in a job system) and/or on the part of the job agent (in particular in a management information system (MIS)). For example, not only paste binding and/or spiral binding apparatuses but rather also simple staple binders can be configured as apparatuses of the type "finishing binder apparatuses".

In particular the degrees of importance and/or preference of the job chaperone data are compared with one another to establish a job processing apparatus to be used, and the job processing apparatus is selected which fulfills the highest degree of importance or preference. In the event that a plurality of apparatuses fulfill the highest degree of importance or preference, that job processing apparatus is selected that additionally fulfills the second highest degree of importance or preference. In the event that again a plurality of apparatuses are available, the apparatus is selected that fulfills the most degrees of importance or preference in order of degree.

The preferred embodiment is usable for job chaperone data of any type in particular for what are known as job ticket data. In particular JDF data and/or JMF data are understood as job chaperone data for the present preferred embodiment, meaning that the preferred embodiment job chaperone data can in particular also comprise data according to the JDF/JMF standard and in particular be connected as a unit with the JDF data of an apparatus resource (device resource) in a product node, a process node, a process group node or in a combined process node.

The preferred embodiment is furthermore in particular advantageous for applications in which identical job chaperone data are provided and used for various print jobs. The greater the degree of coverage of the job chaperone data of various print jobs, the more advantageous the effect of the preferred embodiment because it can react more flexibly in the allocation of the job processing apparatuses. The utilization of the printing apparatuses is thereby uniform and their availability is high.

According to a second aspect of the preferred embodiment that can be viewed in combination or also independent with regard to the first aspect of the preferred embodiment, job chaperone data are sent to a job agent computer for processing of a plurality of document processing jobs by a job provider computer. The job chaperone data thereby comprise time planning data that are usable for time scheduling on the part of a job agent with regard to the assignment of the jobs to job processing apparatuses and that are related to resources.

When the document processing jobs are cached in the job agent computer or a computer connected with this before they are processed according to the jobs (spooling), the time planning can be optimized based on the available time planning data related to the resources, to the effect that time-consuming document processing jobs are thus assigned to the apparatuses that these are not blocked for jobs required on short notice. For this it is in particular advantageous to provide resource data such as the size of the job and/or about recording media to be used.

The processing time planning can alternately occur automatically or manually. Given an automatic time processing planning, a decision about the beginning and/or the assignment of a document processing time procedure to a specific document processing apparatus can in particular be made automatically on the basis of the time required for the processing procedure. Further criteria for the time planning in the processing of document processing jobs can be the time of day, the urgency (priority) of a job, the order of the input of the jobs, the quantity of the recording media to be used, a user selection and/or the identity of a user (job provider). An automatic system or an operating personnel that are active at the job agent computer and determine the time planning then decide when a document processing job is executed based on one or more of the criteria cited above. For example, very extensive jobs can be processed during the night, or jobs that use a specific parameter that is only utilized a little (for example recording medium) can be mutually finished together in the same time span or jobs of a specific job provider so that the jobs are finished at the same time or in close temporal correlation.

According to the second aspect of the preferred embodiment, it is in particular proposed to provide resource-related data as additional time planning information with regard to the existing time planning information in the node information of a job according to the JDF specification. The time planning can thereby in particular occur in a resource-optimized manner and therewith the apparatus availability can be increased because specific resources (for example a specific paper type) is utilized simultaneously at a plurality of jobs or in immediate succession by the jobs. Furthermore, it is therewith better to assemble document processing jobs in groups in order to shorten the processing time in total.

According to a third aspect of the preferred embodiment that can be applied in combination with the two other aspects of the invention or also alone, document data and job chaperone data are sent from a job provider computer to a job agent computer for processing of document processing jobs in a computer-aided document processing system, whereby the job chaperone data comprise data for job processing parameters which can be used to control a job processing apparatus, whereby job processing parameter-specific rights are associated with a user of the job provider computer.

According to this aspect of the preferred embodiment it was recognized that errors in the job processing in a more complex document processing system can be avoided when authorizations for adjustment are given to a job provider in the establishment of job production parameters only for those parameters that correspond to his typical jobs or knowledge. In particular it can hereby be avoided that jobs must be repeatedly re-processed because parameters were incorrectly set. At another point it can be advantageous to provide a job provider with only specific resources that correspond to his typical jobs, for example to enable for all job providers the utilization of unprinted white DIN A4 paper, however to allow only specific users the use of special recording media such as, for example, pre-printed check forms.

For the third aspect of the preferred embodiment it is in particular advantageous to already display to the job provider which resources he has access to before he sends off the job.

According to an advantageous exemplary embodiment of the third aspect of the preferred embodiment, the resource data are coded according to the JDF specification and the authorization association occurs by means of data that are logically connected with the JDF resource data. Furthermore, it is thereby advantageous to provide data about the users and their user rights in a databank and to provide these to all participating components of the job processing system in a process-spanning management information system (MIS). In particular an authentication of the user using the databank can then occur to establish his rights in the system. In particular such an access control can occur for every resource in the system.

According to a fourth aspect of the preferred embodiment that can be executed jointly or in combination with the aforementioned aspects, an attribute about the origin of the document processing jobs is respectively assigned to the document processing jobs for processing of document processing jobs in a computer-aided document processing system in which the document processing jobs are respectively assigned to at least one processing apparatus. Furthermore, with regard to the processing apparatus information is thereby provided that specifies in which time intervals it is available for processing of document processing jobs of specific origin.

According to this aspect of the preferred embodiment it was recognized that document processing jobs can be processed in a time- and resource-optimized manner with networked processing apparatuses in that the assignment of the jobs to the apparatuses occurs according to the origin of the jobs. Via the origin-dependent provision of the apparatuses for the processing jobs at specific times, division-specific prioritizations can occur on the one hand and a uniform utilization of the processing apparatuses can ensue on the other hand. For example, extensive jobs that typically do not necessarily have to be finished on the same day can therewith be identified specific to division or origin and the dispatcher of the jobs can be relegated to processing at times at which the processing apparatuses are not required by more urgent applications assigned to other divisions. In particular when it is sought in the day, for example, to send fewer express jobs of larger extent from divisions or applications typical for these to the processing apparatus (for example larger lists regularly generated from large databanks, accounts generated semi-automatically or the like), it can therewith be effectively prevented that the processing apparatus is blocked for a longer time for more urgent jobs from other applications or divisions.

In a preferred exemplary embodiment of the fourth aspect, the document processing jobs of the specified origin are fed to the processing apparatus only and/or first when the time interval is reached. However, given dispatch of the document processing job a determination can be made as an exception (what is known as an "emergency printing") that the job should in particular be directly processed at the processing apparatus, independent of the availability times (assigned to the processing apparatus) for the origin division. The processing then correspondingly occurs earlier or immediately.

The origin attribute in particular comprises an identifier for an associated computer system generating the document processing job and/or a program running in a computer, in particular for a program generating the document processing job. As an alternative to or in addition to the cited identifiers, the identifier can furthermore be associated with a functional and/or organizational division of a company. Such divisions can, for example, be an office division (office) in which individual documents are generated by office employees, for example with known user programs such as PowerPoint, Word or Excel from the company Microsoft. A further organizational and functional division can, for example, be a print room division (print room, PRP) in which documents are scanned (for example with scanners) and possibly copied, sent per e-mail or telefax and/or are output on printing or multifunction apparatuses (for example with print/fax/e-mail and copier function). A further division can, for example, be a company-wide general data processing division (electronic resource planning, ERP) in which, for example, documents are generated from databank applications. These can, for example, be generated in a largely automatic manner, for example monthly reports generated automatically, statistical evaluations, for payroll and salary accountings, bill calculation and collection letters etc.

For the fourth aspect of the preferred embodiment, it is in particular advantageous that the information about the temporal availability of the processing apparatus is provided to a dispatcher of a document processing apparatus. For this the information can in particular be transmitted from the processing apparatus or a relaying system (such as, for example, a document output management system) to a processing application for dispatch of the processing job, for example a printer driver, and be graphically displayed via this to the user via a graphical user interface. Furthermore, the next availability time and/or an overview of availability time spans can be displayed to the user. The origin divisions can in particular be selected and/or freely established in the processing apparatus, a document output management system and/or in the graphical interface for the user.

The division-specific information about the apparatus availability can be stored or processed in a controller of the apparatus, in an external controller directly associated with the apparatus and/or in an apparatus-spanning controller such as, for example, a document output management system. The router can in particular execute a routing process according to the JDF specification and thereby receive or retrieve status information from the connected processing apparatuses.

According to a fifth aspect of the preferred embodiment that can be viewed independent of or together with the preceding aspects of the preferred embodiment, an information that specifies the availability of the apparatus for document processing jobs from predeterminable origin sources for predeterminable time intervals is stored with regard to at least one apparatus that is provided for processing of document processing jobs.

In an advantageous exemplary embodiment of the fifth aspect, the association of the temporal availability occurs in a menu-controlled manner via a graphical user interface. This can in particular exhibit a calendar function and a function for determination and association of the origin sources. A computer system and/or application program that can in particular be identified in a computer network can be provided as an origin source and/or a functional and/or organizational unit of a superordinate system (in particular of a company) that can be associated with a document generation system.

Shown in FIG. 1 is a document production system 1 that on the one hand comprises a mainframe architecture 2 and on the other hand comprises a network architecture 5 in which document data or, respectively, document print data streams are respectively generated by means of user programs (tools). In the mainframe architecture 2 these print data are generated by a host computer 3, in particular as an AFP print data stream or as a line print data stream. From the host computer 3 the print data can alternately be directly transferred to one or more print apparatuses 6a, 6b via what is known as an S/370 channel 14a. As an alternative to this output channel, the print data can also be transferred from the host computer 3 via a network 13 or a direct data connection 14b to a processing computer 4 in which the print data are cached (for example in an associated file server) and are processed for subsequent output steps. In such host computers 3 in particular print data streams are generated that are composed from larger databases (databanks) of regular list expressions, accounts, consumption overviews (for telephone accounts, gas accounts, bank accounts) etc. Such applications have frequently already been in use for many years and are required as before in a more or less unchanged manner (what are known as legacy applications).

The print production workflow is monitored by a monitoring system within the mainframe architecture 2. It comprises a monitoring computer 7 that is coupled with a databank 7b.

The monitoring system is connected via an apparatus control network 15 and a print manager module 8 with the host computer 3 as well as via a computer 9 with a V24 data line that couples the two print apparatuses 6a, 6b. The converter 9 converts the V24 signals into DMI protocol signals of the device control network 15. SNMP protocol signals can be provided in converted form to the device manager as DMI protocol signals or are directly passed as SNMP protocol signals.

Print good 23 that was generated in the printers 6a, 6b from the document print data stream and on which barcodes are printed can respectively be scanned with a manually movable, radio-controlled barcode reader 11a. The signals are transferred per radio to the read station 10a and are transmitted in the device controller network 15 or to the monitoring system 7. Readers for a one-dimensional and/or two-dimensional barcode are used as barcode readers so that various barcode systems can be read with one and the same reader. The barcode read system is in particular configurable, i.e. can be applied to various application-specific codes or the respective suitable control methods.

In the network architecture 5 document data are generated by means of user programs (for example Microsoft Win-Word®) in client computers 12, 12a that are connected among one another via a client network 13 as well as with the processing computer (file server) 4. The file server therewith serves as a central processing and handling interface for print data of the entire print production system 1. On the file server run diverse control modules (software programs) via which the entire print production workflow or the entire document processing is optimally adapted to the respective conditions in a manner that is application-specific, production-related and takes place on the part of the apparatus controller. PCL, Post Script or PDF are used as print data streams in this architecture.

When an error occurs in the course of the further processing of the data, in particular in the output of the data on one of the print apparatuses 6a, 6b, 6c or 6d, in one of the post-processing apparatuses 22a, 22b or also in the print server 16, this can be determined by the monitoring system 7 using the control barcode inserted in the processing computer 4 and the reprint of the documents (pages, sheets, mail pieces) affected by the disruption can be requested. This reprint request is definitively controlled in the processing computer 4.

The digital print apparatuses 6a, 6b, 6c, 6d exhibit printing speeds of more than 30 pages per minute up to over 1000 DIN A4 pages per minute and can be controlled down to individual points with 600 dpi.

Print data that have been finished by the processing computer 4 are directed to the print server 16 via the print data line 14c. Its task is essentially to unload the processing computer 4. This occurs via buffering of the finished print data until their retrieval via the data line 14d to one or both printers 6c, 6d. The print server 16 is thus predominantly integrated into the overall system for reasons of performance (speed). Given systems whose printing speed is less high, the print server 16 can also be foregone. The print data control can thereby also occur from a controller arranged outside or inside a printer.

Document data that are transmitted to the printers 6c or 6b and there are printed on a recording medium (for example paper) are fed in the overall system to further processing stages, namely the cutting apparatus 22a and the enveloping apparatus 22b of the further processing. The print production process is therewith concluded.

The printed documents are tested with regard to various criteria on their processing path between the respective print apparatuses 6a, 6b, 6c or 6d and the last post-processing apparatus 22b, namely via an optical test system 16 with regard to their optical print quality, with a barcode test system 19 with regard to their presence, their consistency and/or their order as well as with an MICR test system insofar as the print was printed by means of magnetically readable toner (magnetic ink character recognition toner). The data of the various test systems that are supplied by the measurement system 17 are transmitted to the apparatus control network 15 by a common serial data acquisition module (serial delta acquisition module) 21 and fed to the monitoring system 7. There the respective system data are recorded and the apparatuses are checked in real time and the respective positions of the documents are tested in light of their correctness with regard to the print job.

The finished printed documents 23 can in turn be detected with a barcode reader 11b that, for example, is connected in a radio-controlled manner with an associated control device 10b which in turn delivers its data to the monitoring system 7 via the apparatus control network 15.

Figure 2:
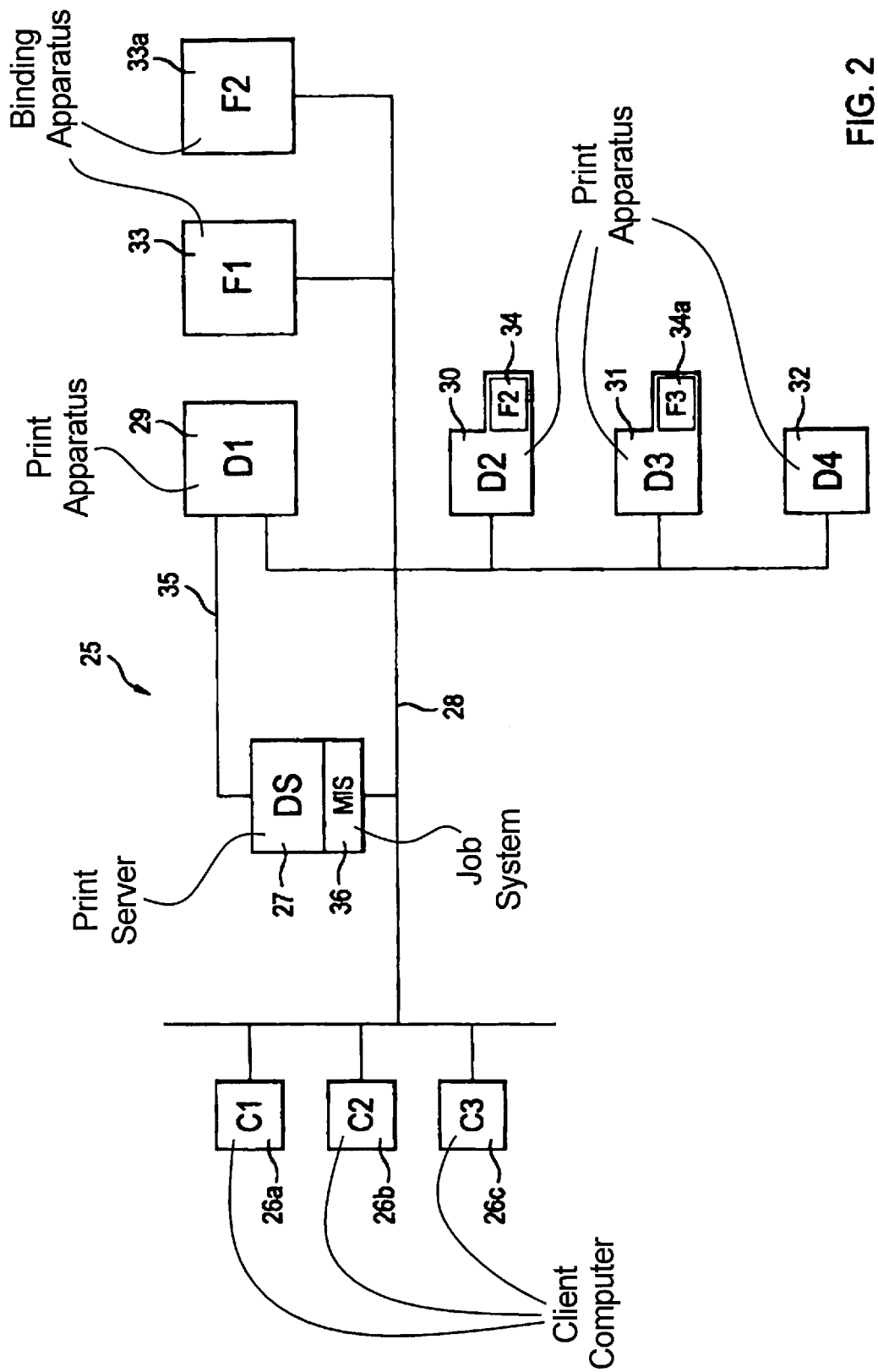
FIG. 2 is a network with only four printing apparatuses.

A somewhat simpler document production system 25 is shown in FIG. 2, in which client computers 26a, 26b, 26c etc. are connected via a network 28 with a print server 27 and a plurality of print apparatuses 29, 30, 31 and 32. Document production jobs for printing and for post-processing of the documents (finishing) can be deposited by the client computers 26a, 26b, 26c. For this the print apparatuses 30 and 31 already comprise integrated finishing apparatuses 34, 35, for example for binding of associated sheets of a document. The two printers 30 (D2) and 31 (D3) are also for the most part structurally identical, whereby a document processing job that is provided for the one apparatus can be executed just as well in the other apparatus. In addition to the connection to the network 28, the print apparatus 29 exhibits another direct data connection 35 to the print server 27 via which in particular print jobs stored in the print server 27 can be printed on the printer 29 without usage or loading of the network 28. Furthermore, a separate finishing apparatus 33 with which documents can be generated with a paste binding is connected to the network 28. A management information system (MIS) 36 runs on the print server 27, which management information system 36 processes the job chaperone data (job tickets), evaluates the status information output by the various connected apparatuses and ultimately establishes which document production job is processed with which apparatus or with which apparatuses. Based on the job chaperone data output by the client computers, in particular about resources and/or temporal specifications, the management information system 36 also decides about which document production jobs are cached in the print server 27, how long they are possibly cached and when they can be transmitted to available suitable or desired apparatuses. The establishment of the point in time at which the document production jobs are related to the corresponding apparatuses can arise from the management information system 36 based on automatic rules or be made manually by an administrator or operator. Each of the print apparatuses 29, 30, 31, 32 additionally has a smaller input memory in which print jobs and/or portions of a larger print job assigned to it are cached.

Figure 3:
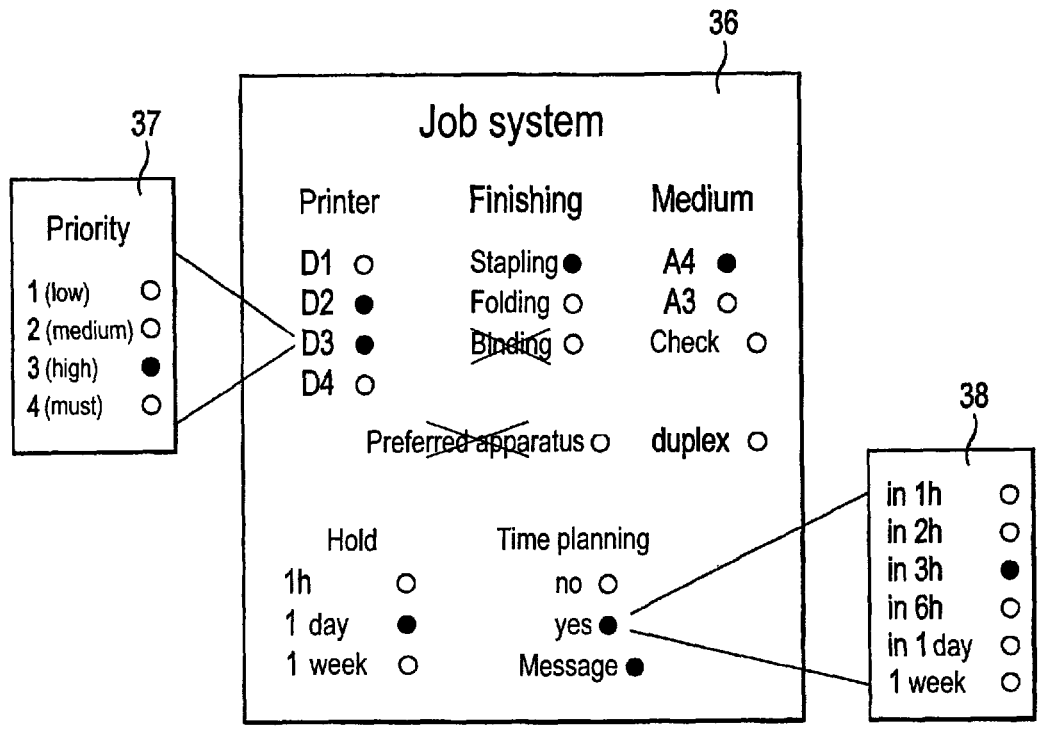
FIG. 3 is a user interface for a job system.

The user interface for a document production job system that can run on one of the client computers 12, 26a, 26b, 26c designated above is shown in FIG. 3. With it the parameters are established with which the production of the documents is controlled in a print production center or at the printers and finishing apparatuses. The data which are specified via this graphical user interface (GUI) 36 are then transferred to the corresponding print server 16, 27 of the document production system. Settings with regard to the four primary parameters "printer", "finishing", "medium", "hold" and "time planning" can be made in the illustrated mask of the job system user interface 36. In the illustrated example the print apparatus D3 (see FIG. 2, 35) was selected under "printer". When "D3" is indicated with the mouse of the corresponding client computer, the selection menu 37 for the priority of the printer additionally appears. When the printer D3 should only be selected as a preferred printer, in this menu one of the settings 1 (low priority), 2 (medium priority) or 3 (high priority) must thus be selected. In contrast to this, if the print apparatus 3 should be selected as a mandatory apparatus, the setting priority 4 (must) must be made.

In the illustrated example printer D2 (FIG. 2, 30) is additionally selected, however with only low priority (level 1). This means that the print is primarily assigned to print apparatus D3 in the print server or with its management information system. Only when this apparatus exhibits a disruption at the point in time of the execution of the job is the job redirected to printer D2. It can thereby additionally be taken into account that in the shown example in "3h" was made under the primary parameter "time planning" in the time planning menu 38, meaning that the entire job must be executed within just three hours. This means that, given a momentary disruption of the print apparatus D3, the execution of the print job can wait whether printer D3 is ready for operation again before the elapsing of the three hour time limit and the job can be executed on the desired print apparatus D3 (and therewith in particular at the desired location at which D3 is situated).

The post-processing parameters for the printed document can be set under the primary parameter "finishing". In the illustrated example the stapling is set. The setting "fold" is not selected, the setting "bind" is automatically crossed out with a red bar by the job system 36 and is identified as not selectable because it recognizes that neither print apparatus D2 nor print apparatus D3 have a binding function. The job system 36 or the associated client computer receives this information via the network 28 from the management information system 36, which retrieves the information directly from the corresponding print or finishing apparatuses. In the present example the finishing apparatus 33 would be equipped with binding functionality. Therefore this functional would axiomatically be indicated in the job system 36; otherwise this function would not appear on the graphical user interface. The display "preferred apparatus" that is likewise crossed out indicates that a preference or priority setting is also possible for the finishing binding devices 33 and 33a, as in the priority menu 37 for the printing apparatuses.

Furthermore, for the printing and finishing apparatuses it can be provided that a display menu with which various items of status information of the apparatuses (for example the current load, more detailed apparatus equipment variants and the like) are displayed is provided in the job system 36. Since, under the circumstances, it is critical in a network to keep the status of these apparatuses current, in particular when the apparatuses are selected as desired or mandatory destination apparatuses by a plurality of jobs, it is in particular advantageous to select these apparatuses only as preferred apparatuses and not as mandatory destination apparatuses when a job should be executed immediately. The immediate execution is indicated by the specification "no" in the primary parameter "time planning" of the job system user interface. Moreover, the option "message" can be selected in this primary parameter, via which option the user automatically receives a notification (in particular per e-mail) when the job is completely executed.

The management information system in the print server 16, 27 then selects the print or finishing apparatus ultimately used for processing under the consideration of the criteria "preference selected by the user, possibly inclusive of level", "current apparatus capabilities" and "apparatus availability".

Under the primary criterion "medium" of the job system user interface 36, the user can select the print media available in the print apparatuses D2 or D3, in this case paper sheets or formats DIN A4 or DIN A3 or pre-printed check forms. Double-sided printing can be selected with the option "duplex". Under the primary parameter "hold" the job provider can furthermore determine whether print jobs are stored in the print server 16, 27 or in the file server 4 for at least one hour, one day or one week.

Figure 4:
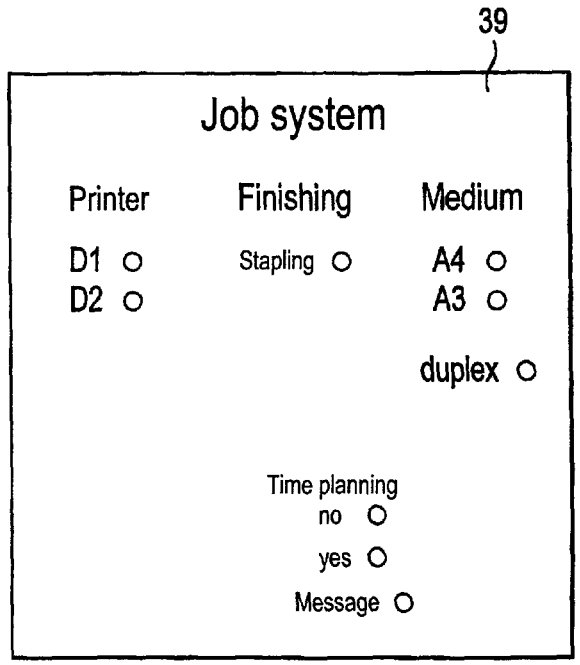
FIG. 4 shows the user interface of FIG. 3 adapted in a user-specific manner.

The graphical user interface 36 which is shown in FIG. 3 gives the user a selection possibility with regard to a plurality of selectable job processing apparatuses and job parameters. The corresponding user has corresponding user rights that are stored under his user ID in the management information system 36. In this regard a graphical user interface 39 of the same job system is shown in FIG. 4 in which both the apparatus selection and the parameter selection is significantly reduced. Significantly fewer access rights are allocated to this user in the management information system 36. He can select only the print apparatuses D1 or D2, has only the possibility of the stapling as a finishing option and may use only sheets of the formats DIN A4 and DIN A3 as media, however not (for example) the pre-printed check forms. Furthermore, in this graphical user interface it is provided that a printer selection generally only works optionally, meaning that a job is not necessarily output on precisely this printer.

In addition to the data specified via the user interfaces 36, 39, upon dispatching of a document production job from one of the client computers 26a, 26b, 26c to the printer servers 27 job chaperone data are sent that relate to diverse resources, namely the size of the job, the utilized media and the quantities of the media.

In the printer server 27 or management information system 36 the decisions are then made as to which document processing jobs are printed out in which apparatuses at which point in time. For this there can either be automatic rules, for example that jobs that exceed a specific size and whose set time planning is at least one day are in principle printed at night. Instead of this or in addition to this, at the print system 27 an administrator or operator can manually make interventions to assign the job processing apparatuses and the job processing times.

Figure 5:
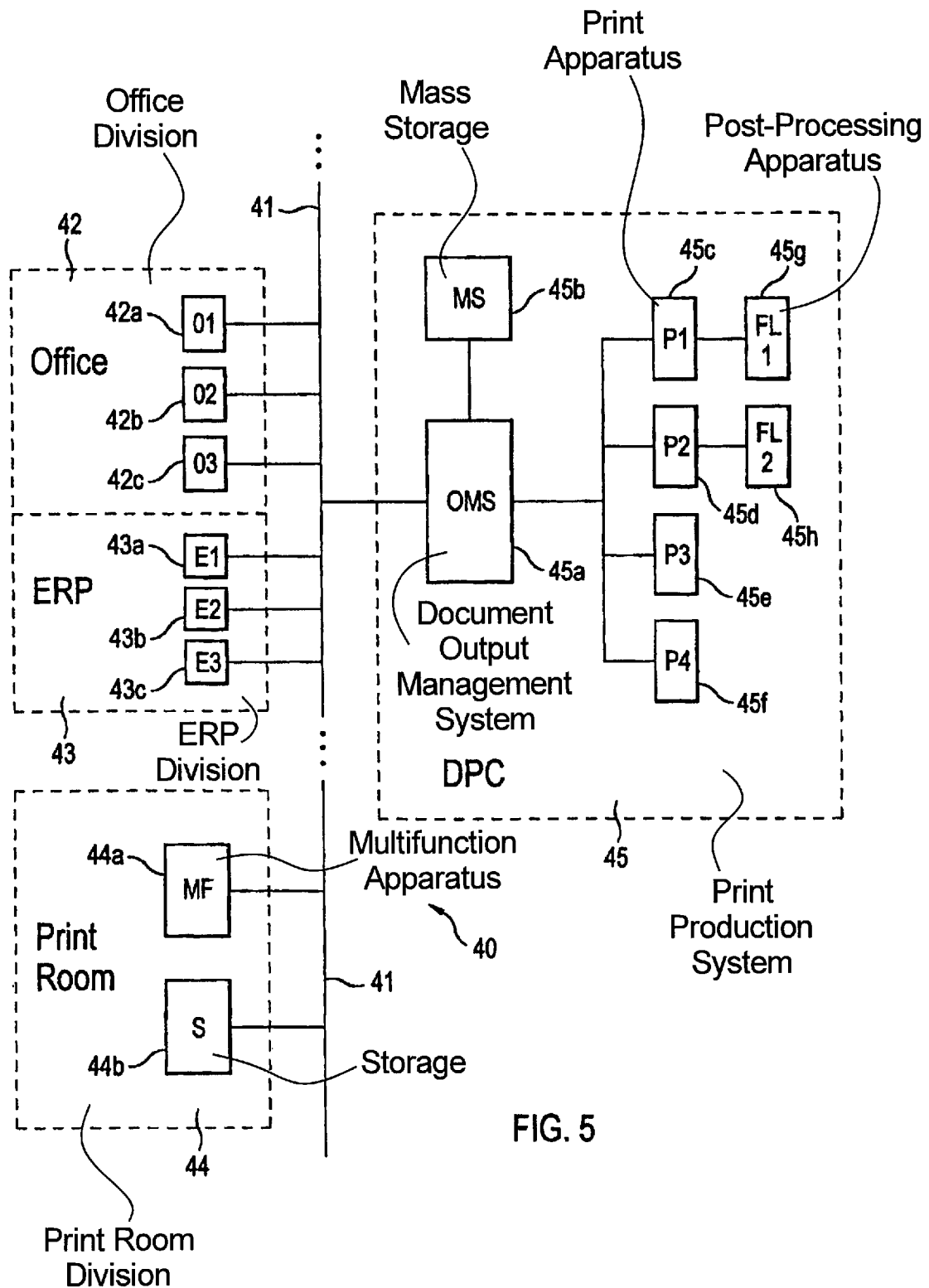
FIG. 5 illustrates a document production system in a company.

In FIG. 5 a document production system 40 is shown in which various systems that generate documents are connected via a data network 41 with systems that process documents. The input apparatuses are associated with organizational divisions of a company and have correspondingly varying functionalities. Personal computers 42a, 42b, 42c on which typical office user computer programs (such as Microsoft Office, Excel or Word) run are associated with an office division (office). Office employees typically create individual documents such as presentations, individual letters, memos etc. in these applications. Company data that are relevant for a plurality of persons or divisions of the company are stored in files and in particular databanks to which many persons have access and from which standardized evaluation documents are typically generated, in which evaluation documents frequently a plurality of pages (for example multiple hundreds of pages) are generated. These company-wide applications (such as, for example, the databank application offered by the company SAP AG, Waldorf, Germany) are connected to the network 40 via corresponding interfaces or computers 43a, 43b, 43c. These programs or computers are associated with the company-wide division ERP (Electronic Resource Planing 43. It is thereby absolutely conceivable that office applications that are associated with the office division 42 (for example Microsoft Word) on the one hand and applications that are associated with the ERP division 43 (for example SAP programs) on the other hand run on one and the same personal computer. The various programs of the computer are then associated per program with the divisions 42 or 43.

Furthermore, print rooms 44 are provided on the network 41 across the company, with which print rooms 44 apparatuses are associated that comprise (typically in centrally resident organization units) apparatuses for generation and/or processing of documents, for example a multifunction apparatus 44a that can scan, copy and print, and a scanner 44b. While the apparatuses 42a through 42c and 43a through 43c are normally used by only a single user, the apparatuses 44a and 44b are normally commonly used by a plurality of users.

For output of document processing jobs, in particular of print jobs with downstream document finishing, the print jobs can alternately be sent to a print production system 45 that in particular comprises apparatuses and control components according to the systems shown in FIGS. 1 and 2 or directly to the multifunction system 44a of the print room division 44. The print production system 45 in turn comprises a document output management system 45a that comprises a mass storage 45b in which print jobs can be stored.

Print jobs that are sent to the document output management system 45a are relayed by this to the available print apparatuses 45c, 45d, 45e, 45f or also to the multifunction apparatus 44a according to predetermined criteria of the print job and the settings made in the output management system 45a.

Print jobs in which a post-processing of the documents is necessary are sent to the print apparatuses 45c or 45d that have corresponding post-processing apparatuses 45g, 45h or also to the multifunction apparatus 44a insofar as this has suitable post-processing devices such as, for example, a stapling apparatus.

The availability of at least one of the print apparatuses connected in the print production system 1 or on the entire network is temporally and restrictively determined according to division or origin data, in the present example according to the organizational function units "office", "print room" and "ERP". The connected computer or the user programs running there are likewise associated with the divisions. The date and organization planning data corresponding to the availability of the output apparatuses (for example printers) are stored in the output management system 45a and can be changed there only by approved users.

Upon dispatch of a print job from one of the connected computers, programs and/or document data-generating apparatus (for example scanner 44b), stored availability data are initially checked using the output management system 45a as to whether the selected processing apparatus (for example print apparatus) is currently available for the system generating the document production job (print job). If applicable, the job is sent to this apparatus for processing. When the output apparatus for the system sending the job is not available, the job is either automatically sent to another previously-established output apparatus, cached until the selected (in particular as preferred or mandatory in the job) determined apparatus is available and/or a graphically-aided dialog is started with which the senders are offered alternative, varying processing possibilities. A variant of this dialog is described further below with regard to FIG. 7. Additionally, a user dialog can occur upon sending of the job as described in U.S. Pat. No. 6,587,861, in particular a dialogue corresponding to FIGS. 67, 106, 1113, 117 and 112) there with associated specification. It is thereby in particular provided to automatically display (in particular via a network-based browser interface) to the user or, respectively, sender of the job a suitable different available apparatus, with the possibility to display jobs already pending for processing at this apparatus and to send the print job to the alternative apparatus for processing. For this purpose U.S. Pat. No. 6,587,861 is again at this point incorporated by reference into the present specification.

Figures 6, 7:
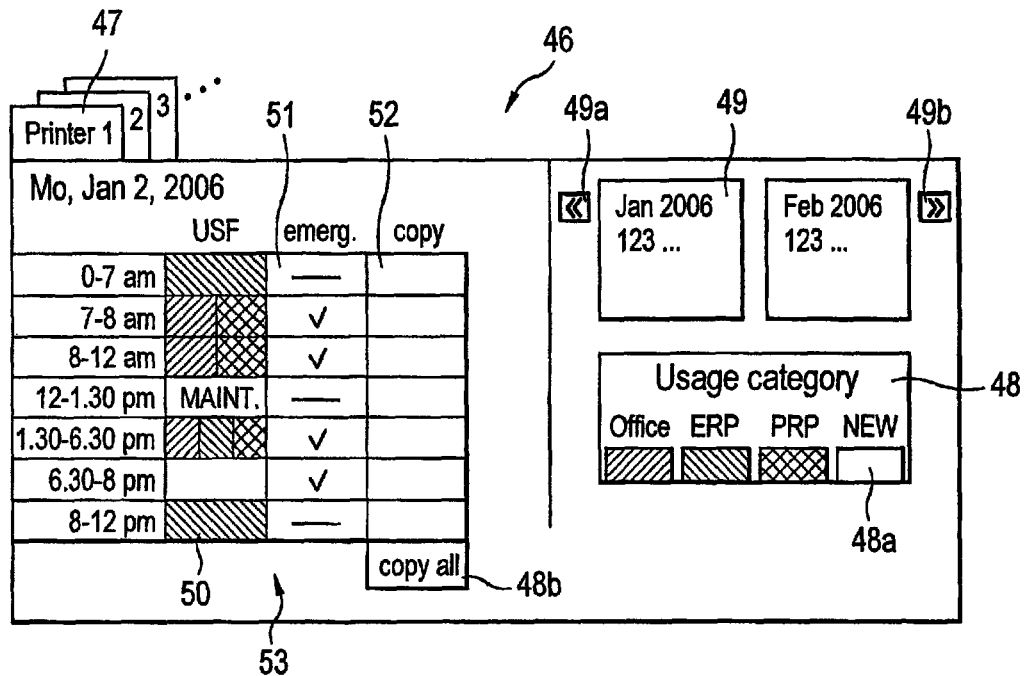
FIG. 6 illustrates a user interface for a temporal apparatus association.
FIG. 7 illustrates a user interface for dispatching a print job.

In FIG. 6 a user interface 46 is shown with which, with regard to various print apparatuses, their temporal availability for various divisions or user categories can be made. The apparatus for which the settings should be established (in the shown case the print apparatus 1) can be selected via a rider 47. In the selection field 48 the various regions or usage categories can be determined. In the present example, these are the region "office" corresponding to the division 42, "Enterprise Resource Planning" (ERP) corresponding to the division 43, and print room (PRP) corresponding to the division 44. Further divisions or categories can be defined at any time via a button 48a.

Calendar sheets that respectively show months and days are indicated in the selection region 49. The calendar pages can be changed to further months via buttons 49a, 49b.

In a planning and determination region 53, for the selected day a table is shown in which the respective unlocked usage regions for the apparatus are determined in a usage column 50 for specific time ranges that are freely adjustable. For example, in the times between 0:00 and 7:00 in the morning as well as 8:00 to 12:00 at night the print apparatus 1 is only available for ERP applications; in contrast to this, in the time between 7:00 and 12:00 before midday the print apparatus 1 is only available for the divisions office and PRP (print room). In the time between 12:00 midday and 1:30 in the afternoon, the apparatus is available for none of the divisions because it must be kept free for maintenance purposes (maintenance). For all indicated time intervals, it can be established in the emergency operation column 51 whether the emergency operation mode is allowed, i.e. whether users from other divisions can execute a print on this apparatus as an exception when they specify this in the dispatch of the print job (see FIG. 7). The emergency operation mode can be individually set for specific divisions, individual users or individual computers or applications. In the copier column 52, the setting specified in the respective line (the time interval) can also be copied to other times or days, whereby a special button "copy all" 48b is provided that enables all settings of the day to other days, including the adoption for time spans comprising multiple days (recurring settings).

Corresponding functions can thereby be used by known date administration programs such as, for example, Microsoft Outlook.

Shown in FIG. 7 is a menu 54 that, upon dispatching of a print job from a job provider apparatus associated with a division 42, 43 or 44, indicates on its graphical user interface (GUI) when a setting according to FIG. 6 has been made. In a region 55 it is thereby indicated to the job provider which print apparatuses are currently available for him, in which room these are arranged and the possibility to select the respective printer is given in an area "Select".

In a display region 56 of the user interface for the job provider, those apparatuses (printers) are indicated that are presently not available for the user due to the division specification applicable for them. Furthermore, it is indicated in which room these printers are arranged and, in a column "Next", the time at which this apparatus will be available again for the user. In this column "Emergency" it is furthermore indicated to him whether the emergency mode (emergency operation mode) is unlocked for him for the respective printer, given which he can currently print on this print apparatus as an exception. If applicable, the user can decide whether he wants to print the job on the print apparatus in the emergency operation mode or sends the print job to this print apparatus in the normal way (selection of "Select"), whereby the print job is then at the earliest processed by the print apparatus at the point in time specified in the column "Next".

Exemplary of the preferred embodiment have been specified; and it is thereby clear that the average man skilled in the art can specify developments at any time. In particular a plurality of further setting possibilities, such as, for example, mailbox printing, enlargement/shrinking, watermark printing etc., can be provided in the graphical user interfaces of the job systems.

The described setting and control methods are in particular suitable for usage in connection with the aforementioned JDF standard. In particular it can thereby be provided that control and information messages are exchanged in all directions between the participating apparatuses or components, for example from a job sending component (such as an application program or a suitable interface such as a printer driver) to the output management system (OMS) and from there, or directly to, the processing apparatus as well as vice versa from the processing apparatus to the OMS and from there, or directly to, the job sending component. An intelligent processing can in particular use the "Device status Information" provided in JDF or the possibilities provided in the associated Job Messaging Format (JMF). The supplementary information described above, in particular the information or determinations about availability times complete the information provided according to JDF or JMF that can be exchanged across apparatuses or systems.

The preferred embodiment is in particular suited to be realized as a computer program (software). As a computer program module, it can therewith be distributed as a file on a data medium such as a diskette, CD-ROM or DVD or as a file via a data or communication network. Such and comparable computer program products or computer program elements are variations of the preferred embodiment. The workflow can be used in a computer, in a print apparatus or in a printing system with upstream or downstream data processing apparatuses. It is thereby clear that corresponding computers on which the preferred embodiment is applied can comprise further known technical devices such as input means (keyboard, mouse, touchscreen), a microprocessor, a data or, respectively, control bus, a display device (monitor, display) as well as a working memory, a fixed disk storage and a network card.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A method for processing of a plurality of document processing jobs in a computer-aided document processing system, comprising the steps of:

generating job chaperone data via a graphical user interface by a job provider computer by user interaction that manually identifies one or more preferred job processing printer apparatuses relative to other job processing printer apparatuses of a same type in said job provider computer with respect to a document processing job, and wherein said job chaperone data comprise respective printer preference data about a degree of preference manually selected from multiple priority levels of degree of priority by the user for each of said one or more job processing printer apparatuses of the same type, said chaperone data being stored in a job ticket file output from said job provider computer for said document processing job to a job agent computer which uses the printer preference data created by said user interaction to identify the preferred one or more job processing printer apparatuses;

also providing the job chaperone data with time scheduling data useable for a job agent-side time scheduling with regard to assignment of the jobs to the job processing printer apparatuses of a same type, and wherein the time scheduling data are related to resources comprising physical objects consumed by processing the jobs in the printer apparatuses of the same type; and sending said job chaperone data created by the user from the job provider computer to the job agent computer.

2. The method according to claim 1 wherein specifications about the preferred one or more job processing printer apparatuses occur via said graphical user interface.

3. The method according to claim 1 wherein the determination of the one or more job processing printer apparatuses to be used to satisfy desired job parameters occurs in said job agent computer, and additionally dependent on a capability of the job processing printer apparatuses.

4. The method according to claim 1 wherein in the job agent computer the determination of the one or more job processing printer apparatuses to be used additionally occurs dependent on availability of the job processing printer apparatuses.

5. The method according to claim 1 wherein the job chaperone data comprise data according to a JDF standard, and are connected with at least one of data of a product node, an apparatus resource in a process node, a process group node, and a combined process node as a unit.

6. The method according to claim 1 wherein the job chaperone data comprise at least one of a size of a job file, about a type of a recording medium to be used, and about a quantity of the recording medium to be used.

7. The method according to claim 1 wherein said time scheduling data being provided comprises a decision about a beginning of a document processing procedure and relates to a time required for the processing procedure.

8. The method according to claim 1 wherein the job chaperone data comprise data regarding job processing parameters which can be used to control the one or more job processing printer apparatuses, and wherein job processing parameter-specific rights are associated with a user of the job provider computer.

9. The method according to claim 8 wherein the job processing parameter-specific rights are checked in the job provider computer, and acceptance of data regarding a parameter in the job chaperone data blocked for the user is prevented.

10. The method according to claim 9 wherein a parameter-specific display occurs on a graphical user interface of the job provider computer when the user has no authorization to the parameter.

11. The method according to claim 8 wherein the job processing parameter-specific rights are checked in the job agent computer and execution of a blocked function in the processing printer apparatus is prevented.

12. The method according to claim 1 wherein data that identify the job processing printer apparatus in a manner individual to the apparatus are exchanged between the job provider computer and the job agent computer.

13. A non-transitory computer readable medium having a computer program thereon for processing of a plurality of document processing jobs in a computer-aided document processing system, said program performing the steps of:

generating job chaperone data via a graphical user interface by a job provider computer by user interaction that manually identifies one or more preferred job processing printer apparatuses relative to other job processing printer apparatuses of a same type in said job provider computer with respect to a document processing job, and wherein said job chaperone data comprise respective printer preference data about a degree of preference manually selected from multiple priority levels of degree of priority by the user for each of said one or more job processing printer apparatuses of the same type, said chaperone data being stored in a job ticket file output from said job provider computer for said document processing job to a job agent computer which uses the printer preference data created by said user interaction to identify the preferred one or more job processing printer apparatuses;

also providing the job chaperone data with time scheduling data useable for a job agent-side time scheduling with regard to assignment of the jobs to the job processing printer apparatuses of a same type, and wherein the time scheduling data are related to resources comprising physical objects consumed by processing the jobs in the printer apparatuses of the same type; and sending said job chaperone data created by the user from the job provider computer to the job agent computer.

14. A system for processing a plurality of document processing jobs, comprising:

a job provider computer for generating job chaperone data via a graphical user interface by user interaction that manually identifies one or more preferred job processing printer apparatuses relative to other job processing printer apparatuses of a same type in said job provider computer with respect to a document processing job, and wherein said job chaperone data comprise respective printer preference data about a degree of preference manually selected from multiple priority levels of degree of priority by the user for each of said one or more job processing printer apparatuses of the same type, said chaperone data being stored in a job ticket file output from said job provider computer for said document processing job to a job agent computer which uses the printer preference data created by said user interaction to identify the preferred one or more job processing printer apparatuses;

said job provider computer also providing the job chaperone data with time scheduling data useable for a job agent-side time scheduling with regard to assignment of the jobs to the job processing printer apparatuses of a same type, and wherein the time scheduling data are related to resources comprising physical objects consumed by processing the jobs in the printer apparatuses of the same type; and said job provider computer sending said job chaperone data created by the user to the job agent computer.

15. The system according to claim 14 wherein specifications about the preferred one or more job processing printer apparatuses occur via said graphical user interface.

16. The system according to claim 14 wherein the determination of the one or more job processing printer apparatuses to be used to satisfy desired job parameters occurs in said job agent computer, and additionally dependent on a capability of the job processing printer apparatuses.

17. The system according to claim 14 wherein in the job agent computer the determination of the one or more job processing printer apparatuses to be used additionally occurs dependent on availability of the job processing printer apparatuses.

18. The system according to claim 14 wherein the job chaperone data comprise data according to a JDF standard, and are connected with at least one of data of a product node, an apparatus resource in a process node, a process group node, and a combined process node as a unit.

19. The system according to claim 14 wherein the job chaperone data comprise at least one of a size of a job file, about a type of a recording medium to be used, and about a quantity of the recording medium to be used.

20. The system according to claim 14 wherein said time scheduling data being provided comprises a decision about a beginning of a document processing procedure and relates to a time required for the processing procedure.

21. The system according to claim 14 wherein the job chaperone data comprise data regarding job processing parameters which can be used to control the one or more job processing printer apparatuses, and wherein job processing parameter-specific rights are associated with a user of the job provider computer.

22. The system according to claim 21 wherein the job processing parameter-specific rights are checked in the job provider computer, and acceptance of data regarding a parameter in the job chaperone data blocked for the user is prevented.

23. The system according to claim 22 wherein a parameter-specific display occurs on a graphical user interface of the job provider computer when the user has no authorization to the parameter.

24. The system according to claim 21 wherein the job processing parameter-specific rights are checked in the job agent computer and execution of a blocked function in the processing printer apparatus is prevented.

25. The system according to claim 14 wherein data that identify the job processing printer apparatus in a manner individual to the apparatus are exchanged between the job provider computer and the job agent computer.

* * * * *